(12) United States Patent
Wu et al.

(10) Patent No.: US 12,292,815 B2
(45) Date of Patent: May 6, 2025

(54) METHOD FOR SYSTEM PROFILING AND CONTROLLING AND COMPUTER SYSTEM PERFORMING THE SAME

(71) Applicant: REALTEK SEMICONDUCTOR CORP., Hsinchu (TW)

(72) Inventors: Yi-Kuan Wu, Hsinchu (TW); Sheng-Kai Hung, Hsinchu (TW); Tsai-Wei Wu, Hsinchu (TW); Tsai-Chin Cheng, Hsinchu (TW); Yu-Kuen Wu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 91 days.

(21) Appl. No.: 18/323,422

(22) Filed: May 25, 2023

(65) Prior Publication Data
US 2023/0409462 A1    Dec. 21, 2023

(30) Foreign Application Priority Data
Jun. 16, 2022    (TW) .................................. 111122314

(51) Int. Cl.
*G06F 1/24*       (2006.01)
*G06F 9/00*       (2018.01)
(Continued)

(52) U.S. Cl.
CPC .......... *G06F 11/3495* (2013.01); *G06F 9/485* (2013.01); *G06F 11/0793* (2013.01);
(Continued)

(58) Field of Classification Search
CPC .. G06F 11/3495; G06F 9/485; G06F 11/0793; G06F 11/3409; G06F 2209/481;
(Continued)

(56) References Cited

U.S. PATENT DOCUMENTS 7,707,579 B2 *  4/2010  Rodriguez ............ G06F 9/5072
                                                  718/1
10,666,566 B2    5/2020  Lin et al.
(Continued)

FOREIGN PATENT DOCUMENTS

CN    110138797 B    12/2021
TW    202121167 A    6/2021

*Primary Examiner* — Xuxing Chen
(74) *Attorney, Agent, or Firm* — Li & Cai Intellectual Property (USA) Office (57) ABSTRACT

A method for system profiling and controlling and a computer system performing the same are provided. In the method, an operating system is operated after the computer system is booted, in which a profiling-controlling system is operated. When the operating system loads and executes a system profiling-controlling program, the profiling-controlling system that simultaneously operates a profiling routine and a controlling routine is initiated. The profiling routine is used to retrieve system kernel data that is generated during operation of the operating system and analyze the system kernel data through a kernel tracing tool. When it is determined that controlling is required, the profiling routine notifies the controlling routine. The controlling routine controls operating parameters of the operating system in real time according to an analysis result generated by the profiling routine.

16 Claims, 6 Drawing Sheets

(51) Int. Cl.
  *G06F 9/48* (2006.01)
  *G06F 11/07* (2006.01)
  *G06F 11/34* (2006.01)
  *H04L 47/24* (2022.01)
  *H04L 43/0829* (2022.01)

(52) U.S. Cl.
  CPC .......... *G06F 11/3409* (2013.01); *H04L 47/24* (2013.01); *G06F 2209/481* (2013.01); *G06F 2209/482* (2013.01); *G06F 2209/485* (2013.01); *H04L 43/0829* (2013.01)

(58) Field of Classification Search
  CPC ......... G06F 2209/482; G06F 2209/485; G06F 2201/865; H04L 47/24; H04L 43/0829
  See application file for complete search history.

(56) References Cited

U.S. PATENT DOCUMENTS

| | | |
|---|---|---|
| 11,507,485 B2 | 11/2022 | Hung et al. |
| 2012/0185597 A1 | 7/2012 | Luna |
| 2016/0246647 A1* | 8/2016 | Harris ................... G06F 9/5027 |
| 2016/0261472 A1 | 9/2016 | Tubi et al. |
| 2017/0060635 A1* | 3/2017 | Wu ....................... G06F 9/5011 |
| 2017/0337083 A1 | 11/2017 | Wu et al. |

\* cited by examiner

METHOD FOR SYSTEM PROFILING AND CONTROLLING AND COMPUTER SYSTEM PERFORMING THE SAME

CROSS-REFERENCE TO RELATED PATENT APPLICATION

This application claims the benefit of priority to Taiwan Patent Application No. 111122314, filed on Jun. 16, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology for system calibration, and more particularly to a method for system profiling and controlling based on real time information of a specific event and a computer system performing the same.

BACKGROUND OF THE DISCLOSURE

In a computer system (such as a Linux® operating system), a tool for dynamically distributing a processor interrupt request (IRQ) can be, for example, Linux® irqbalance. The Linux® irqbalance is a system daemon, and its purpose is to achieve a processor workload balance through interrupt distribution and thereby improve the system performance. However, in such a conventional interrupt handling mechanism, the lowest time unit for dynamically distributing the processor interrupt request is once per second. Therefore, the conventional interrupt handling mechanism cannot be used in applications that need a faster interrupt distribution.

In the conventional technology, a conventional system monitoring scheme cannot discover and calibrate a system problem in time. A Linux® Cilium program is able to extract workload information from a system kernel by means of software, and thereby achieve a dynamic flow balance (particularly a network traffic balance). Further, the Linux® Cilium program is able to resolve a network connection problem. However, the Linux® Cilium program is designed for a data center but not for a user-end environment. Further, the Linux® Cilium program neither provides any additional interrupt distribution, nor conducts a dynamic setting based on hardware properties.

Further, in a Linux® OS platform implemented in a system on a chip, a specific solution is provided for accelerating a specific function, but this solution may negatively affect other functions. Such a trade-off may sacrifice an overall system performance.

For example, while a system priority of a wireless LAN thread in the system kernel can be increased to improve performance of a network, this adjustment of the priority may relatively affect the priority of playing a streaming video. That is, the application with a high priority can acquire too many processor resources. Therefore, the smoothness of the streaming video may be affected since the wireless LAN thread acquires too many computing resources.

In one further example, interrupt mitigation in a network interface card (NIC) is increased for reducing performance of a processor dedicated to the network, such that there is an opportunity to improve the overall system performance. However, some small-packet applications (such as small-sized file accessing and webpage accessing) may have a problem of packet loss since registers of the network interface card are easily filled up if the interrupt mitigation is increased.

SUMMARY OF THE DISCLOSURE

In response to the above-referenced technical inadequacies, the present disclosure provides a method for system profiling and controlling and a computer system performing the same. In order to achieve a purpose of effectively distributing resources of the computer system (e.g., fast distribution of an interrupt request (IRQ) in the computer system), the method for system profiling and controlling incorporates an intelligent system-controlling mechanism to distribute system resources in an event-driven manner and according to user-end applications. The method is particularly applicable to network traffic distribution. In the computer system, the method achieves technical effects that include customization at a user end, dynamic hardware resources distribution, and instantaneous response to contingency.

In one aspect, the computer system that performs the method for system profiling and controlling includes a processing unit. The processing unit operates an operating system after the computer system is booted, and loads a system profiling-controlling program from a memory unit. Then, the processing unit performs steps as follows. The system profiling-controlling program is executed for initiating a profiling routine and a controlling routine. The profiling routine is used to retrieve and analyze system kernel data of the computer system. The controlling routine is used to control operating parameters of the operating system according to an analysis result of the profiling routine.

Moreover, the profiling routine analyzes the system kernel data by a kernel tracing tool in the operating system, and notifies the controlling routine of the analyzed data. The kernel tracing tool can be an extended Berkeley packet filter of a Linux® system, and is used for analyzing behaviors (which include dynamic tracing, static tracing and event profiling) of a system kernel of the Linux® system.

Further, the profiling routine analyzes the system kernel data by a data processing tool and analyzes packets passing through a network interface card, so as to find erroneous packets.

Still further, the profiling routine analyzes the system kernel data by a performance analysis tool for obtaining system operating performance, so as to discover system problems.

The profiling routine determines whether or not to control operating parameters for the operating system by comparing the analysis result with a controlling threshold. After that, the profiling routine generates a controlling signal if a comparison result shows the controlling is required, and the controlling signal is transmitted to the controlling routine as reference to controlling operating parameters.

When the profiling routine determines that different applications operated in the operating system are affected by network traffic, the profiling routine notifies the controlling routine to control priority of one or more threads of the applications of the operating system in real time.

Alternatively, when the profiling routine determines that a network interface card of the computer system has a problem of packet loss due to a buffer memory being filled up, the profiling routine notifies the controlling routine to control parameters of interrupt mitigation.

The profiling routine is able to profile an event of out of memory, an event of activating an out-of-memory killer or an event of memory allocation failure. The controlling routine is able to control a memory level after the profiling routine notifies the controlling routine of one of the events.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Compared with conventional system kernel tools (e.g., Linux® BCC (BPF compiler collection)) that are mainly used to perform tracing and profiling functions but cannot instantly detect system problems or perform controlling in real time, the present disclosure provides a method for system profiling and controlling and a computer system that performs the method. A profiling-controlling system implemented by the computer system is an intelligent solution for performing controlling at an appropriate time based on instant information. The profiling-controlling system is an event-driven solution for achieving faster distribution of system resources. The method is also to distribute the resources based on behavior at a user end (e.g., controlling operating parameters with respect to problems of network traffic). Furthermore, if the method is applied to a specific compatible hardware (such as a system on chip (SoC) and a network interface card (NIC)), the method for system profiling and controlling and the profiling-controlling system can effectively enhance system performance through distribution of hardware resources.

Figure 1:
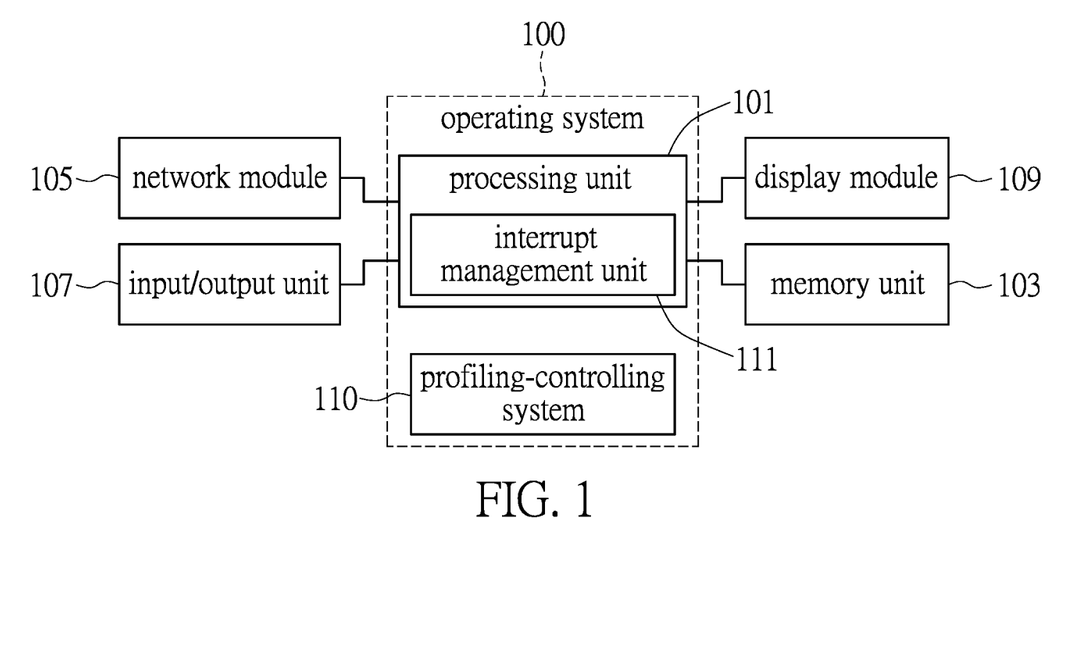
FIG. 1 is a schematic diagram illustrating a computer system that performs a method for system profiling and controlling according to one embodiment of the present disclosure.

FIG. 1 is a schematic diagram illustrating the computer system that performs the method for system profiling and controlling according to one embodiment of the present disclosure.

After the computer system is booted, a processing unit 101 operates an operating system 100. The processing unit 101 includes an interrupt management unit 111 that is used to manage interrupt requests (IRQ) made by peripheral circuit components to the processing unit 101. The peripheral circuit components can be, for example, a memory unit 103, a network module 105, an input/output unit 107 and a display module 109.

In the method for system profiling and controlling, the operating system 100 is operated after a booting process, and the processing unit 101 loads a system profiling-controlling program from a memory unit 103. After the processing unit 101 executes the system profiling-controlling program, a profiling routine and a controlling routine are initiated.

According to one embodiment of the present disclosure, the operating system 100 can be, for example, a Linux® operating system or any Linux®-based operating system. An analysis tool in a kernel of the Linux® operating system can be an extended Berkeley packet filter (i.e., eBPF). The eBPF is an analysis tool that is built within the Linux® kernel for analyzing internal behavior of the system kernel. The functions of the eBPF include dynamic tracing, static tracing and event profiling. However, the kernel analysis tool lacks real-time controlling capability. In one embodiment of the method for system profiling and controlling and the computer system of the present disclosure, the operating system operates an event-driven profiling-controlling system 110. The profiling-controlling system 110 is preferably a software tool that is implemented through execution of the system profiling-controlling program by the processing unit 101. In this way, the purpose of performing controlling based on real-time system kernel data can be achieved. For example, the operating parameters affecting the hardware performance of the network module 105 can be controlled in real time.

The method for system profiling and controlling performed by the profiling-controlling system 110 embodies a mechanism of intelligent system control (ISC). The profiling-controlling system 110 includes two routines that are collaborated by hardware and software. The profiling-controlling system 110 includes a profiling routine for discovering system problems and a controlling routine for controlling system resources. The profiling routine can be used to profile the system kernel data (e.g., data of operating performance of the memory unit 103, the network module 105 and the input/output unit 107), and the controlling routine can be used to control operating parameters of these circuit components. The profiling and controlling routines are implemented by a profiling routine and a controlling routine that are respectively operated in the operating system. It should be noted that the profiling routine and the controlling routines can be two separate procedures or threads, and can also be two functions in one procedure.

Figure 2:
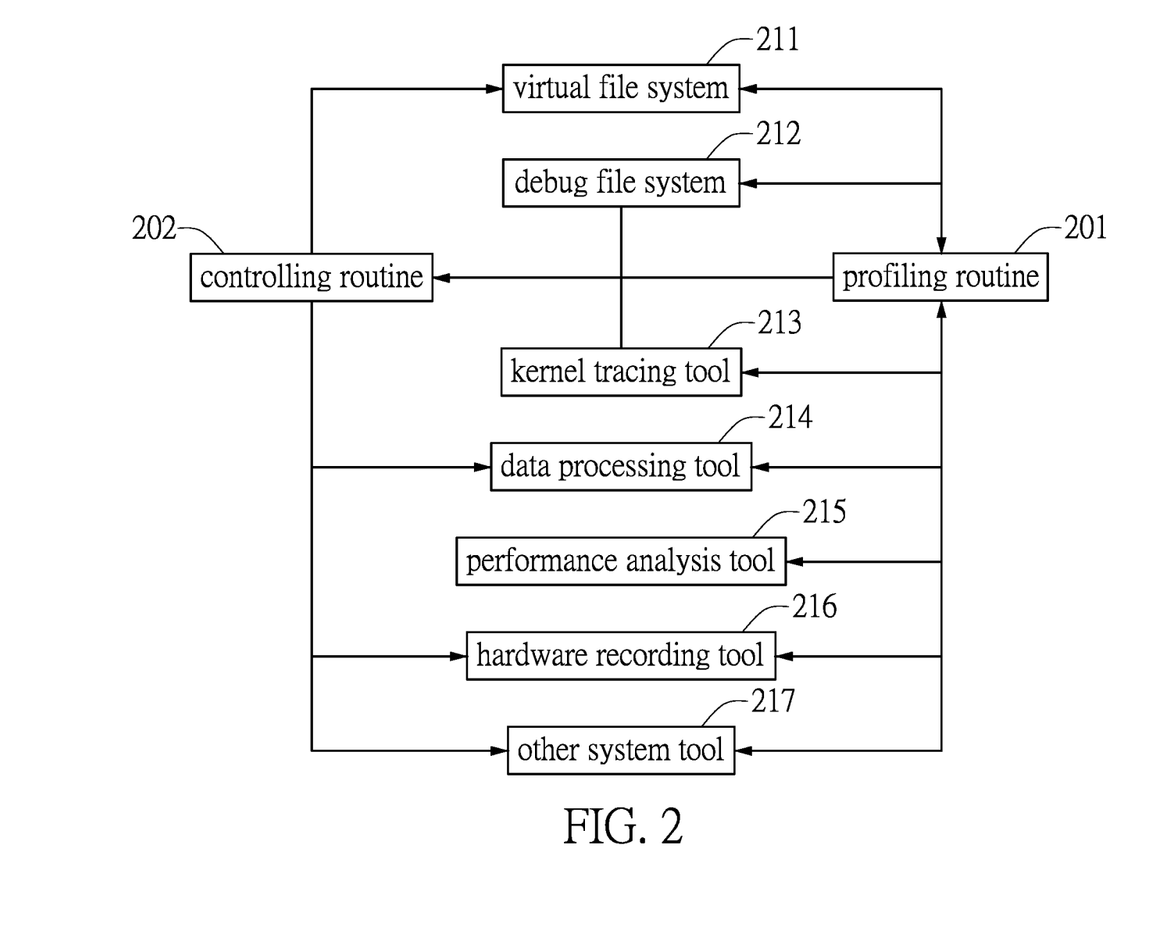
FIG. 2 is a schematic diagram illustrating a framework of a profiling-controlling system according to one embodiment of the present disclosure.

According to one embodiment of the method for system profiling and controlling, the system kernel data can be retrieved by various subsystems and software tools operated in the operating system. Reference is made to FIG. 2, which is a schematic diagram illustrating a framework of the profiling-controlling system according to one embodiment of the present disclosure.

When the profiling-controlling system is in operation, two routines (i.e., a profiling routine 201 and a controlling routine 202) are initiated. The profiling routine 201 is able to access data of the system kernel. The controlling routine 202 controls operating parameters for each of the system kernel tools according to an analysis result made by the profiling routine 201. The sources of the system kernel data can be a virtual file system 211 and a debug file system 212 shown in the framework.

Taking the Linux® operating system or the Linux®-based operating system as an example, the virtual file system 211 can be a virtual file system ("sysfs" or "procfs") of the Linux® operating system. For example, the virtual file system "sysfs" is a native file system of the Linux® operating system. The virtual file system "sysfs" is used as an interface for accessing a kernel data structure, in which system parameters that can be read, written and controlled are stored. The virtual file system "procfs" is also a native file system of the Linux® operating system. The virtual file system "procfs" provides a communication service between a kernel space and a user space.

Accordingly, the virtual file system 211 can output information of a computer device and drivers from the kernel space to the user space in the form of virtual files. The computer device and the drivers can also be set through the virtual file system 211.

The debug file system 212 can be a debug file system ("debugfs") of the Linux® operating system. The debug file system 212 is a virtual file system that is used to conduct kernel debugging and allows kernel developers to exchange data with the user space. In the Linux® operating system, the debug file system ("debugfs") is a virtual file system that is used to provide information of a system kernel procedure and the file system. The system developers can rely on the information to process system tuning. Thus, the profiling routine 201 is able to analyze the system kernel data that is retrieved from the debug file system 212 in real time, so as to generate a controlling signal. The controlling signal is used to notify the controlling routine 202 for performing a real-time controlling.

The profiling routine 201 can also obtain system operation information through other system kernel tools. The system kernel tools are, for example, a kernel tracing tool 213, a data processing tool 214, a performance analysis tool 215, a hardware recording tool 216, and other system tools 217 shown in the diagram. The controlling routine 202 can further perform controlling upon the virtual file system 211, the kernel tracing tool 213, the data processing tool 214, the performance analysis tool 215, the hardware recording tool 216, and the other system tools 217.

Taking the Linux® operating system or the Linux®-based operating system as an example, the kernel tracing tool 213 can be the extended Berkeley packet filter ("eBPF") of the Linux® operating system. The "eBPF" is a built-in behavior analysis tool in the kernel of the Linux® operating system. The "eBPF" is used to trace behavior of applications and the operating system. A statistical approach can be used to retrieve meaningful information from the behavior of the applications and the operating system. Other system kernel tools include "bcc tool" and "bpftrace" that are simplified eBPF tools.

The data processing tool 214 can be an eXpress data path (XDP) of the Linux® operating system. In an exemplary example where network packets are processed, the profiling routine 201 can determine whether to process or abandon the packets at an early stage of discovering the packets to be erroneous through the eXpress data path.

The performance analysis tool 215 can be "perf" (performance) of the Linux® operating system, which is a performance analysis tool built in the system kernel and is used to obtain system operating performance. Through the "perf", the system problems can be quickly discovered. The profiling routine 201 can analyze a part of the system that is required to be controlled through the performance analysis tool 215. The meaningful information of system performance data obtained through the "perf" can be obtained by a statistical approach. Therefore, the controlling routine 202 performs controlling upon the part required to be controlled. For example, the profiling routine 201 retrieves the system kernel data including an operating status of the SoC and that of the network interface card in the system through the performance analysis tool 215.

The hardware recording tool 216 is a system recording tool specified to information of system hardware (such as the system on chip (SoC) and the network interface card of the system). When the controlling routine 202 simultaneously receives the controlling signal generated by the profiling routine 201 and the data that requires controlling, the data is buffered in a register. The hardware recording tool 216 is then used to control the related operating parameters (e.g., parameters of interrupt mitigation). In addition to the above-mentioned software tools, other systems tool 217 can also be used.

Figure 3:
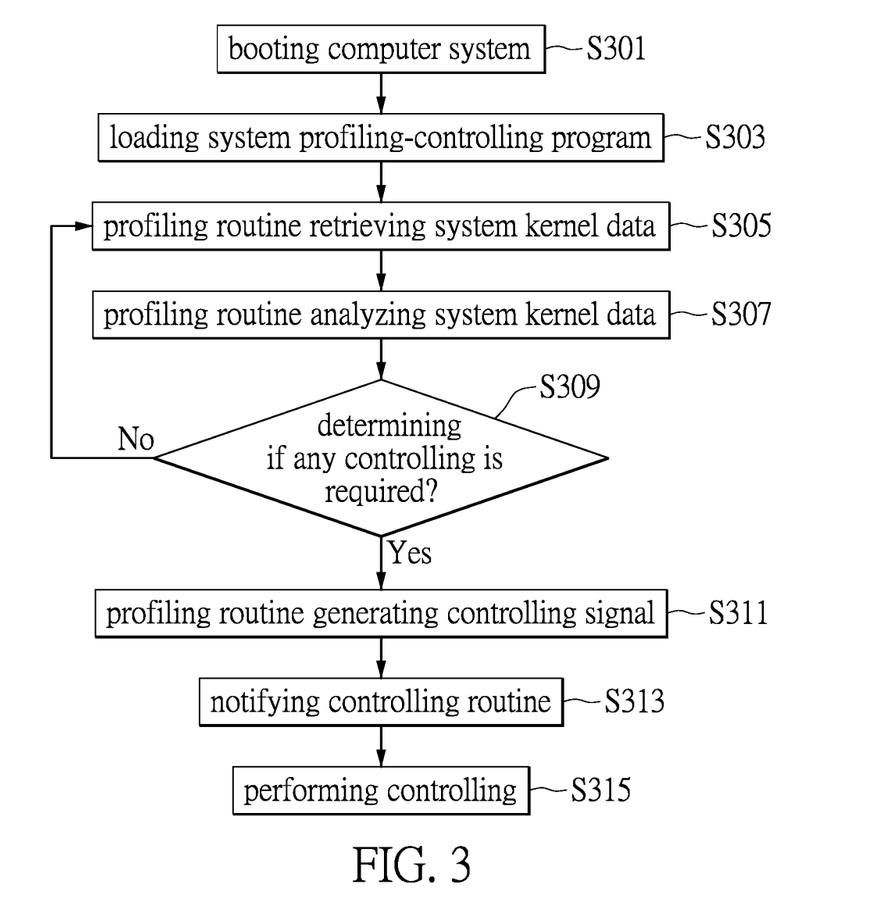
FIG. 3 is a flowchart illustrating the method for system profiling and controlling according to one embodiment of the present disclosure.

Reference is made to FIG. 3, which is a flowchart illustrating the method for system profiling and controlling based on the profiling-controlling system shown in FIG. 2.

An operating system is operated after a computer system is booted (step S301). The operating system loads and executes a system profiling-controlling program from a memory, and then a profiling-controlling system that acts as a daemon in the operating system is initiated (step S303). The profiling routine 201 and the controlling routine 202 are operated at the same time.

When the profiling-controlling system is in operation, the profiling-controlling system can actively obtain the system kernel data generated as the operating system operates through the profiling routine 201 (step S305). The system kernel data can be, for example, interrupt data of a processor, operating data of the memory, or network traffic data of the computer system. According to one embodiment of the present disclosure, the profiling routine 201 obtains the system kernel data through the kernel tracing tool 213. The system kernel data also includes the operating data retrieved from the virtual file system 211 and the debug file system 212, and the operating data of the network interface card retrieved through the data processing tool 214. The packets through the network interface card can be analyzed, and the erroneous packets can be discovered. The performance analysis tool 215 is used to obtain the operating status of various circuit components (such as the SoC and the network interface card of the system). The performance analysis tool 215 is an event-driven tool that can actively notify the profiling routine 201, and the profiling routine 201 is continuously driven to analyze the system kernel data (step S307).

In one embodiment of the present disclosure, the profiling routine 201 analyzes the system kernel data through the kernel tracing tool 213. The profiling routine 201 can compare the analysis result with a controlling threshold, so as to determine whether or not to perform the controlling (step S309). If a comparison result indicates that a real-time controlling is necessary (yes), the profiling routine 201 generates a controlling signal (step S311). The controlling signal denotes that an event is required to be controlled, and the controlling routine 202 is notified (step S313) for controlling the operating parameters of the operating system based on the analysis result generated by the profiling routine (step S315). Conversely, if the comparison result indicates that there is not any event that needs to be controlled in real time, the steps S305 to S309 are repeated.

Figure 4:
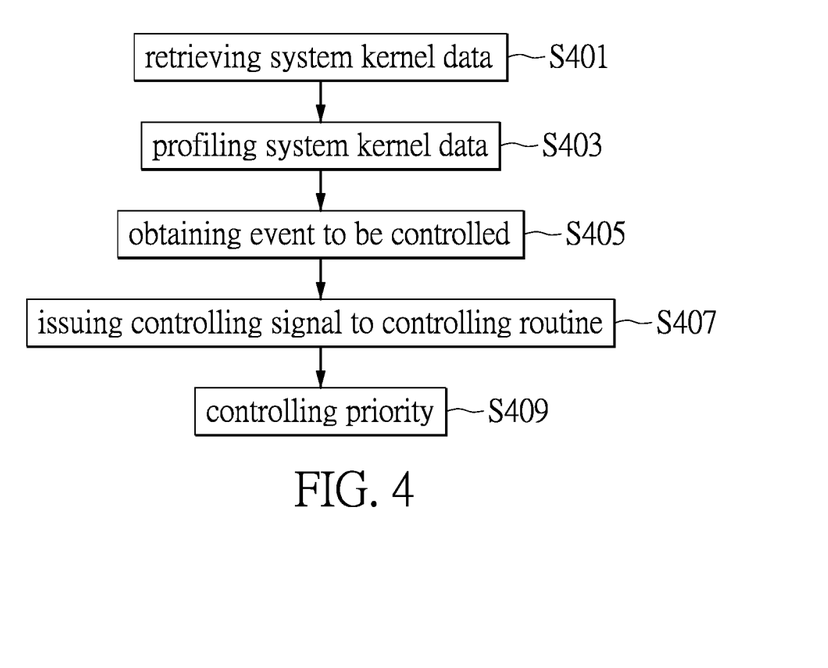
FIG. 4 is a flowchart illustrating an exemplary example of an application of the method for system profiling and controlling.

FIG. 4 is a flowchart illustrating an exemplary example of the method for system profiling and controlling operated in the profiling-controlling system shown in FIG. 2 according to one embodiment of the present disclosure.

The operating system loads and executes the system profiling-controlling program. The profiling routine 201 is initiated to retrieve the system kernel data (step S401). The profiling routine 201 profiles the system kernel data through the kernel tracing tool 213 or the data processing tool 214 operated in the operating system (step S403). Through the profiling routine 201, a context switch, packet content and a process behavior are profiled for analyzing impact of the network traffic on different applications in the operating system. For example, if the flow of a streaming video is affected by the network traffic such that there is occurrence of a traffic congestion, the controlling routine 202 is required to control the related operating parameters (step S405), and a controlling signal that records the related event is transmitted to the controlling routine 202 (step S407). The controlling routine 202 controls priority of one or more application threads in the operating system through a specific system tool (e.g., a "chrt" command) In the event that a local area network affects the network traffic, the priority of the thread of the local area network is controlled (step S409) for resolving the traffic congestion in real time.

According to the flowchart shown in FIG. 4, in an exemplary example, the threads in the processor are switched by a mechanism of profiling the context switch. An interrupt request (IRQ) mechanism is used to switch the threads in the processor if multiple threads in the processor share computing resources of the processor of the computer system. When receiving an interrupt, the processor performs the context switch. In general, if the priority of the local area network thread is raised, the performance of the network can be improved. However, the application of the local area network should not have a high priority as compared with the application of the streaming video. Therefore, if the local area network thread takes up too many processor resources, the streaming video may be subject to occurrence of network congestion. When the profiling routine finds that the performance of decoding the streaming video or playing the streaming video is affected after analyzing the data relating to the network traffic of multiple applications in the system kernel data, the controlling routine is notified and timing of interrupt is adjusted in real time by controlling the context switch. The priority of the local area network thread can be lowered, so that the problem of traffic congestion of the streaming video can be instantly solved.

Figure 5:
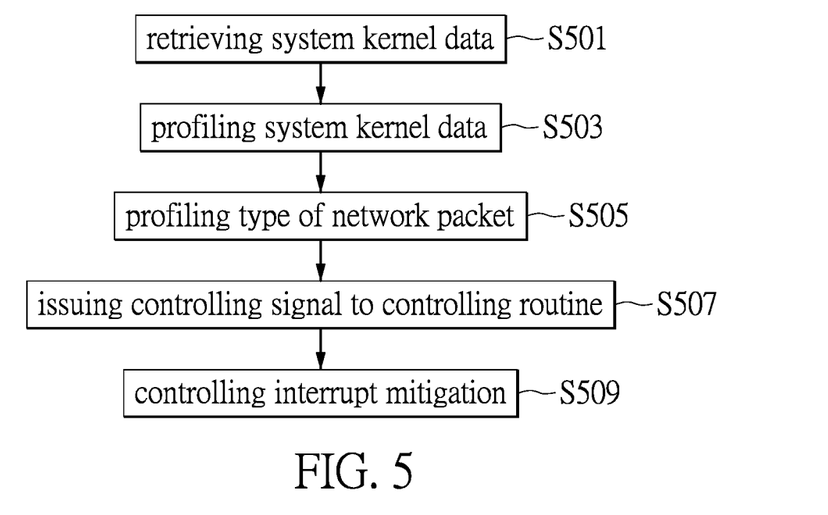
FIG. 5 is a flowchart illustrating an exemplary example of another application of the method for system profiling and controlling.

FIG. 5 is a flowchart illustrating the method for system profiling and controlling operated by the profiling-controlling system shown in FIG. 2 according to another embodiment of the present disclosure.

The operating system loads and executes the system profiling-controlling program, and the profiling routine 201 is initiated for actively retrieving the system kernel data. A "perf" sequence in the Linux® operating system actively notifies the profiling routine 201 (step S501) for profiling the system kernel data (step S503). The context switch, the packet content and the process behavior are profiled for profiling whether the network packet is in the form of a big packet or a small packet, or in the form of a small file or a big file (step S505). For example, an "ethtool" tool in the Linux® operating system can be used to analyze if any packet loss occurs in the network interface card.

When the profiling routine 201 finds the problem that requires the controlling routine 202 to control the system, the controlling signal that records the event to be controlled is transmitted to the controlling routine 202 (step S507). The controlling routine 202 retrieves records in the memory of the network interface card through the hardware recording tool 216, so as to control the parameters of interrupt mitigation (step S509).

On the other hand, in addition to the problem of packet loss occurred due to the system performance being affected, the network interface card of a network module of the system may also have the problem of packet loss due to the raised interrupt mitigation. The interrupt mitigation affects the number of packets to be processed in the computer system at a time. Based on the flowchart shown in FIG. 5, in the process of controlling priority of a specific thread in the event of network traffic congestion, the interrupt mitigation of the network interface card can be raised for reducing the performance that the processor unilaterally spends for the local area network. Therefore, an overall system performance can be improved. However, some small-packet applications (such as a small file transmission or a web application) may still have the problem of packet loss since a buffer memory of the network interface card may be easily filled up by raising the interrupt mitigation. In this regard, the profiling-controlling system is able to perform controlling on an instant event. For example, if the packet loss occurs, the interrupt mitigation of the network interface card can be controlled instantly.

In an exemplary example, if a mitigation time is set in 800 microseconds (us), the network interface card is configured to receive 8 packets within this mitigation time, and the computer system processes the 8 packets at one procedure.

If the mitigation time is set in 200 us, the network interface card receives only 2 packets within this mitigation time and the computer system shall repeat four procedures to process the 8 packets. This means that the workload of the processor of the computer system in the 200 us mitigation time is four times the workload in the 800 us mitigation time. Therefore, the profiling routine can obtain an application that uses the network by analyzing the packet content (e.g., a header). If the application takes up too many processor resources due to any unbalance (which can give rise to traffic congestion), the profiling-controlling system controls the priority of each of the applications in the operating system in real time.

Figure 6:
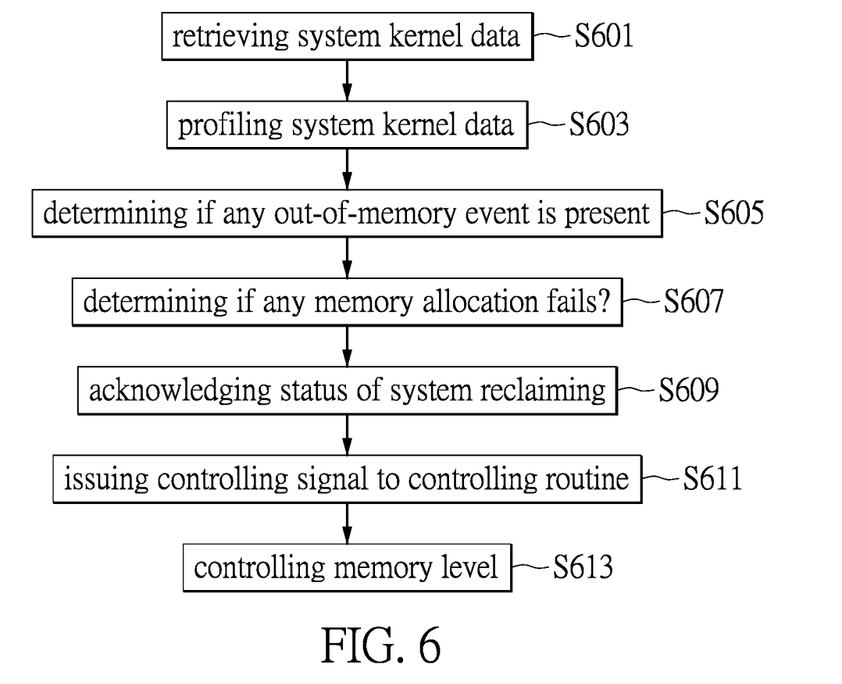
FIG. 6 is a flowchart illustrating an exemplary example of yet another application of the method for system profiling and controlling.

Reference is made to FIG. 6, which is a flowchart illustrating the method for system profiling and controlling operated by the profiling-controlling system shown in FIG. 2 according to yet another embodiment of the present disclosure.

The operating system loads and executes the system profiling-controlling program, in which the profiling routine 201 actively retrieves the system kernel data, or the profiling routine 201 is notified by the kernel tracing tool 213 or the data processing tool 214 of the Linux® operating system via a "perf" sequence (step S601). The profiling routine 201 then profiles the system kernel data (step S603). For example, the profiling routine 201 profiles operation information of the memory recorded in a specific location (e.g., ftrace events oom) of the operating system to determine if any event of out of memory or any event of activating an out-of-memory (oom) killer occurs (step S605). From another specific location (e.g., ftrace events kmem), the profiling routine 201 also profiles to learn if an event of memory allocation failure occurs (step S607). The profiling routine 201 can obtain a status of system reclaim from yet another specific location (e.g., ftrace events vmscan) (step S609).

The profiling routine 201 determines if any controlling is required to be performed by comparing the operating status in various memories with the controlling threshold. If the comparison result indicates that the controlling is required, the profiling routine transmits a controlling signal recording the related event to the controlling routine 202 (step S611). The controlling routine 202 uses a memory adjustment function, such as procfs (min_free_kbytes, watermark_scale_factor, extra_free_kbytes), to control a memory level (step S613).

Referring to the flowchart shown in FIG. 6, in an exemplary example, if the memory of the Linux® operating system is insufficient and exceeds the memory level, a conventional internal mechanism of the operating system reclaims the memory. However, if an amount of the required memory is too large to reclaim, an out-of-memory killer is activated to kill a specific application occupying the memory. The memory level is generally required to be written as a fixed value based on different behaviors on different platforms. Thus, in the profiling-controlling system, after profiling the system kernel data, the profiling routine actively detects a current memory level and whether or not any event of activating the out-of-memory killer occurs. The controlling routine can dynamically set different memory levels for avoiding activating the out-of-memory killer.

Based on the above embodiments of the present disclosure, the profiling routine is used to analyze the memory level applied to the operating system. Before the memory level is so low as to kill any thread, the controlling routine controls the memory level. The memory level can be controlled based on a memory operating curve shown in FIG. 7.

Figure 7:
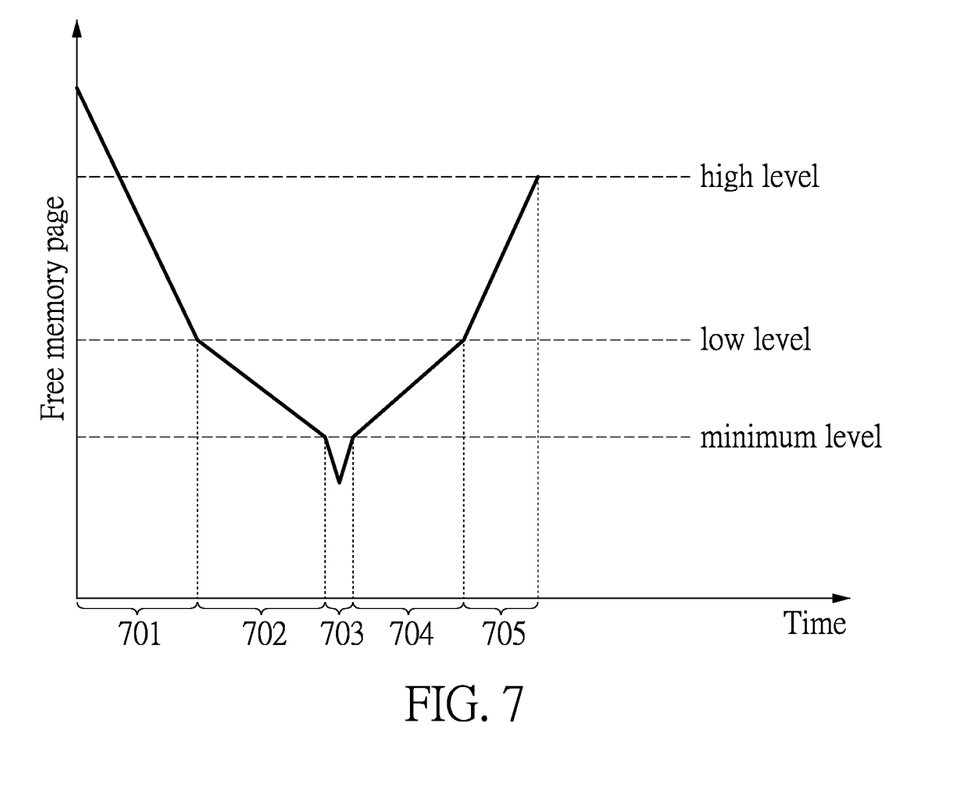
FIG. 7 shows an exemplary curvature that is referred to for controlling operation of a memory of a system kernel.

According to the curve shown in FIG. 7, a vertical axis denotes free memory pages, and a horizontal axis denotes time. There are several fixed memory levels that are specified to several operating environments. The memory curve indicates memory usage over time and several measures corresponding to different memory levels. The free memory page declines within an interval of a first time 701, and the operating system allocates the memory normally. The memory level reaches a low level within an interval of a second time 702, and a specific memory management tool (e.g., kswapd daemon) of the operating system selectively reclaims the memory by checking the memory usage to ensure that the remaining memory is sufficient. Afterwards, if the remaining memory is insufficient to meet the system requirement even after the memory management tool reclaims the memory, the memory is continuously consumed, and the memory level may reach or be lower than a minimum memory level within an interval of a third time 703. In the conventional technology, a memory-reclaiming procedure is automatically activated for a direct reclaim of the memory until the memory reaches a ready-for-use status (i.e., at a fourth time 704). If the memory level is restored to a high level within a fifth time 705, the memory management tool enters a sleep state.

However, in a process of memory management, out of memory occurs if the required amount of memory is too large to reclaim at a time. In the meantime, the out-of-memory (oom) killer actively kills a specific application. Different from the conventional technology, the profiling routine of the profiling-controlling system provided in the present disclosure retrieves a status of memory usage from the system kernel data and continuously compares the memory usage with the controlling threshold, so as to check whether or not the memory usage conforms to a system default rule. That is, the profiling routine determines whether or not the out-of-memory killer is activated based on the system kernel data, and determines the requirement of a current memory level for dynamically setting different memory levels.

In an exemplary example, according to an operating rule of the profiling-controlling system, when the profiling routine finds that the memory usage conforms to the rule, the controlling routine uses the memory adjustment function, such as procfs (min_free_kbytes, watermark_scale_factor, extra_free_kbytes), to control the memory level.

Based on the above embodiments, the effect that the method for system profiling and controlling achieves is that by dynamically controlling the related operating parameters, the performances of some applications do not need to be compromised or sacrificed. The dynamic controlling routine can effectively improve usability of hardware functions, and the hardware cost is not increased for some applications. For example, by dynamically controlling the interrupt mitigation, the buffer memory of the network interface card can be effectively used such that the hardware cost is reduced. By controlling the priority of the local area network thread, the network can be used without traffic congestion.

The method for system profiling and controlling and the computer system performing the same can achieve the purpose of dynamically distributing the system resources and improving the system performance. Some examples are provided below, and practical applications and effects are not limited thereto.

Example one: when a high-resolution (e.g., 4K) streaming video is played, a higher network bandwidth is required. The profiling-controlling system can firstly control a network thread in a system kernel to have a normal priority, and the system resources can be allocated to other applications. When the profiling routine profiles the system resources and finds that the streaming video has the problem of traffic congestion, the profiling-controlling system controls the network thread to have a higher priority for enhancing the network performance.

Example two: when the profiling routine of the profiling-controlling system finds that a network attached storage (NAS) suffers packet loss when transmitting small files, the controlling routine of the profiling-controlling system automatically controls the interrupt mitigation of the network interface card, so as to solve the problem of packet loss.

Example three: the profiling-controlling system operated in the computer system automatically detects a foreground process over a graphical user interface (GUI) operated in the operating system (e.g., the Linux® operating system, Android® or Chrome OS®), and assigns the foreground process with a higher network thread priority for a better user experience.

Example four: every operating environment is assigned with a fixed memory level to avoid killing a specific procedure for reclaiming memory due to insufficient memory in the operating system (e.g., the Linux® operating system). The profiling-controlling system operating the method for system profiling and controlling can automatically detect if a problem kill (e.g., the oom killer) is activated and detect the requirement of a current memory level through the profiling routine. After that, the controlling routine of the profiling-controlling system dynamically sets the different memory levels.

Example five: a gaming program operated in the operating system often suffers network lag due to a downloading process running in a background. When the profiling-controlling system automatically detects the foreground gaming program, the downloading process running in the background is controlled to have a lower priority for a better user gaming experience.

Example six: when the background processes of the operating system are too complicated and overloaded, and the system lacks a mechanism to distribute the computing resources, a single processor or a single core of the computer system may not have sufficient resources, thereby resulting in a low performance. The profiling-controlling system can automatically detect whether or not any processor has the problem of insufficient resources. If the processor suffers the problem of insufficient resources, the controlling routine of the profiling-controlling system transfers the process in the processor (or core) to another processor (or core) and also transfers the hardware and software interrupt to yet another processor (or core), so as to balance the resources and enhance the system performance.

In conclusion, in the method for system profiling and controlling and the computer system performing the same provided by the present disclosure, after the computer system is booted, the operating system initiates the profiling-controlling system to use the profiling routine for discovering the system problems in real time and use the controlling routine for controlling parameters according to the system kernel data obtained by the profiling routine. Thus, the profiling-controlling system can dynamically discover the system problems by the profiling routine and dynamically distribute the system resources by the controlling routine, so as to achieve a better performance.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for system profiling and controlling, comprising:
    operating an operating system after a computer system is booted, and loading and executing a system profiling-controlling program that includes a profiling routine and a controlling routine;
    retrieving and analyzing system kernel data of the computer system by the profiling routine; and
    controlling, according to an analysis result generated by the profiling routine, operating parameters of the operating system by the controlling routine;
    wherein, when the profiling routine finds that a system operating performance is affected after analyzing the data relating to network traffic of multiple applications in the system kernel data, the controlling routine is notified and timing of interrupt request is adjusted in real time by controlling a context switch, and priority of a local area network thread is controlled for resolving traffic congestion.

2. The method according to claim 1, wherein the profiling routine analyzes the system kernel data by a kernel tracing tool in the operating system, and notifies the controlling routine of analyzed data.

3. The method according to claim 2, wherein the kernel tracing tool is an extended Berkeley packet filter of a Linux™ system, and is used for analyzing behavior of a system kernel of the Linux™ system.

4. The method according to claim 2, wherein the profiling routine analyzes the system kernel data by a data processing tool and analyzes packets passing through a network interface card.

5. The method according to claim 2, wherein the profiling routine analyzes the system kernel data by a performance analysis tool for obtaining the system operating performance, so as to discover system problems.

6. The method according to claim 1, wherein the profiling routine determines whether or not to control the operating parameters of the operating system by comparing the analysis result with a controlling threshold; wherein, in response to a comparison result showing that the controlling is required, the profiling routine generates a controlling signal, and the controlling signal is transmitted to the controlling routine, so that the controlling routine controls the operating parameters.

7. The method according to claim 6, wherein, when the profiling routine determines that a network interface card of the computer system has a problem of packet loss due to a buffer memory being filled up, the profiling routine notifies the controlling routine to control parameters of interrupt mitigation.

8. The method according to claim 6, wherein, when the profiling routine profiles an event of out of memory, an event of activating an out-of-memory killer or an event of memory allocation failure, the profiling routine notifies the controlling routine to control a memory level.

9. A computer system that performs a method for system profiling and controlling, comprising:
a processing unit, wherein the processing unit operates an operating system after the computer system is booted, and loads a system profiling-controlling program from a memory unit to perform following steps:
executing the system profiling-controlling program that includes a profiling routine and a controlling routine;
retrieving and analyzing system kernel data of the computer system by the profiling routine; and
controlling, according to an analysis result generated by the profiling routine, operating parameters of the operating system by the controlling routine;
wherein, when the profiling routine finds that a system operating performance is affected after analyzing the data relating to network traffic of multiple applications in the system kernel data, the controlling routine is notified and timing of interrupt request is adjusted in real time by controlling a context switch, and priority of a local area network thread is controlled for resolving traffic congestion.

10. The computer system according to claim 9, wherein the profiling routine analyzes the system kernel data by a kernel tracing tool in the operating system and notifies the controlling routine of analyzed data.

11. The computer system according to claim 10, wherein the kernel tracing tool is an extended Berkeley packet filter of a Linux™ system and is used for analyzing behavior of a system kernel of the Linux™ system.

12. The computer system according to claim 10, wherein the profiling routine analyzes the system kernel data by a data processing tool and analyzes packets passing through a network interface card.

13. The computer system according to claim 10, wherein the profiling routine analyzes the system kernel data by a performance analysis tool for obtaining system operating performance, so as to discover system problems.

14. The computer system according to claim 9, wherein the profiling routine determines whether or not to control the operating parameters of the operating system by comparing the analysis result with a controlling threshold; wherein, in response to a comparison result showing that the controlling is required, the profiling routine generates a controlling signal, and the controlling signal is transmitted to the controlling routine, so that the controlling routine controls the operating parameters.

15. The computer system according to claim 14, wherein, when the profiling routine determines that a network interface card of the computer system has a problem of packet loss due to a buffer memory being filled up, the profiling routine notifies the controlling routine to control parameters of interrupt mitigation.

16. The computer system according to claim 14, wherein, when the profiling routine profiles an event of out of memory, an event of activating an out-of-memory killer or an event of memory allocation failure, the profiling routine notifies the controlling routine to control a memory level.

* * * * *